United States Patent [19]
Sturges

[11] 3,937,530
[45] Feb. 10, 1976

[54] REVERSIBLE TRACK LINK WITH CLAMPED-ON SHOE

[75] Inventor: James R. Sturges, Washington, Ill.

[73] Assignee: Caterpillar Tractor Co., Peoria, Ill.

[22] Filed: Jan. 30, 1975

[21] Appl. No.: 545,449

[52] U.S. Cl. ................................... 305/54; 305/56
[51] Int. Cl.² ........................................ B62D 55/28
[58] Field of Search ............ 305/54, 55, 56, 39, 10, 305/19, 31

[56] References Cited
UNITED STATES PATENTS

| | | | |
|---|---|---|---|
| 1,820,695 | 8/1931 | Engstrom | 305/54 X |
| 2,329,303 | 9/1943 | Stewart | 305/54 X |
| 2,954,086 | 9/1960 | Butman | 305/54 X |
| 3,815,962 | 6/1974 | Stedman | 305/54 X |

*Primary Examiner*—Philip Goodman
*Attorney, Agent, or Firm*—Phillips, Moore, Weissenberger, Lempio & Strabala

[57] ABSTRACT

An endless track assembly for a track type vehicle comprises a plurality of symmetrical track links each having a track shoe clamped thereon by a plurality of hook or U-bolts. Upon release of the bolts, the track link may be reversed and the track shoe reattached to an opposite side thereof by the bolts.

8 Claims, 4 Drawing Figures

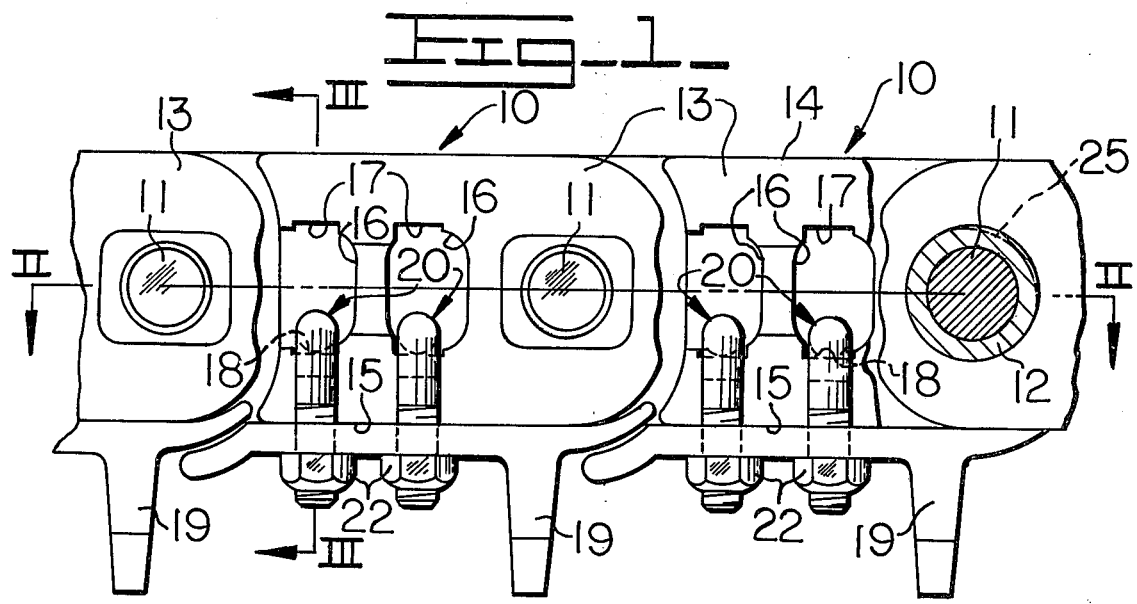
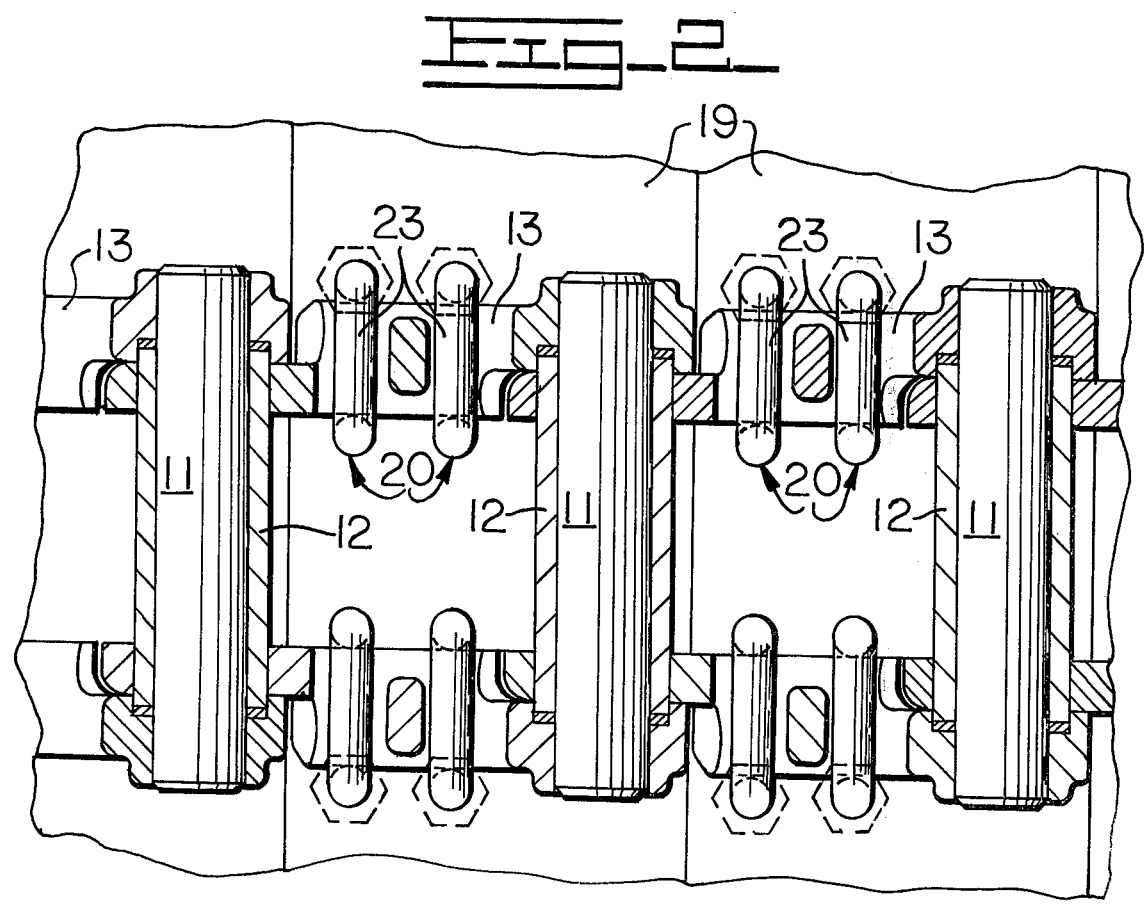

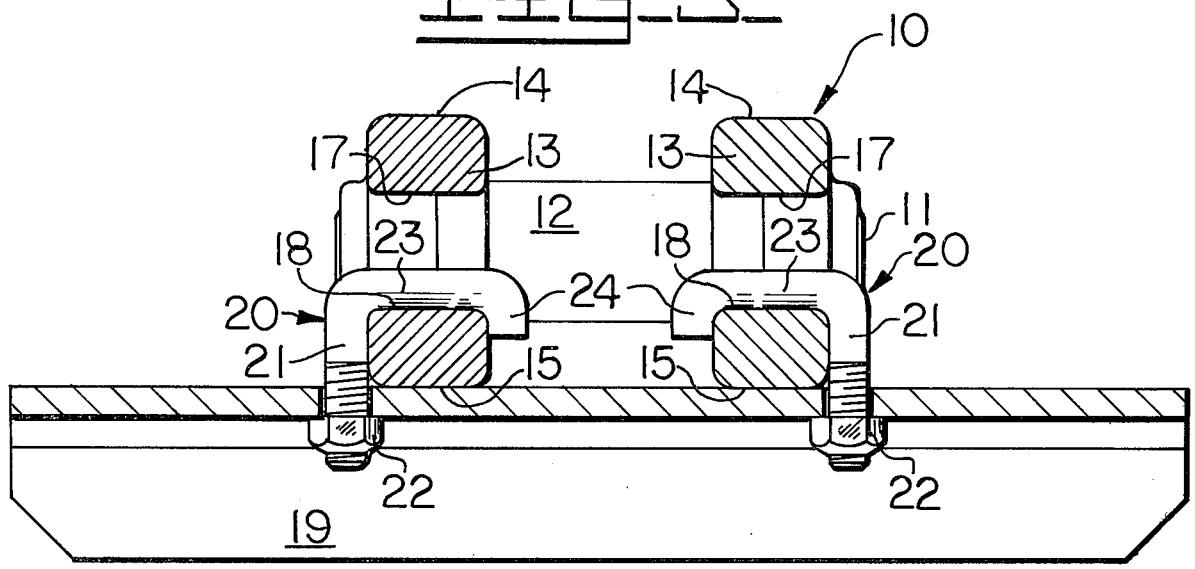
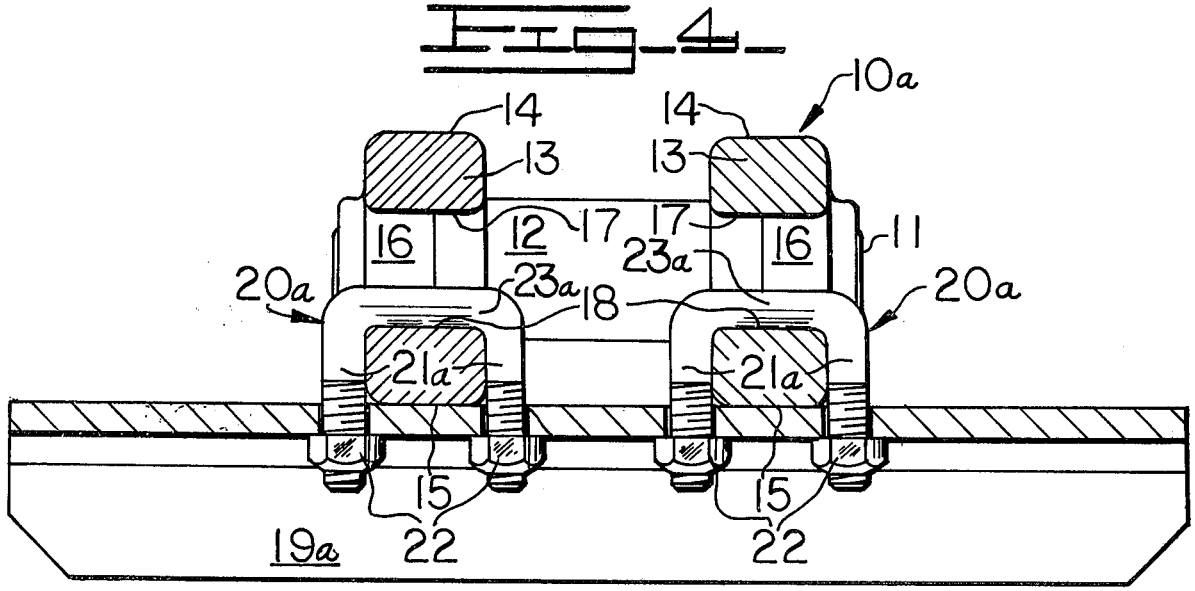

_(3,937,530)_

REVERSIBLE TRACK LINK WITH CLAMPED-ON SHOE

BACKGROUND OF THE INVENTION

Conventional track type vehicles, such as crawler tractors, are adapted for heavy duty work during various construction and earthworking operations. Each endless track assembly thereof comprises a pin and bushing assembly for pivotally connecting each pair of adjacent links and track shoes together. The bushings, which further function as drive lugs adapted to engage the teeth of a drive sprocket, are subjected to wear and require periodic repair or replacement. The servicing of such bushings is time consuming and necessitates rather expensive repair or replacement procedures normally including complete dismantling of the track assemblies.

Various reversible track links, having bolt holes formed transversely therethrough, have been proposed to overcome such problems. The formation of such holes in the track links increases manufacturing costs and reduces the structural integrity of the track links. In addition, the area of the rail surface of the track links, adjacent to the holes, tends to deform or break to render the holes unusable and/or to damage such rail surface.

SUMMARY OF THE INVENTION

An object of this invention is to overcome the above briefly described problems by providing an economical and non-complex reversible track link assembly for track-type vehicles adapted to provide a new bearing surface on a drive lug attached to a track link thereof upon reversal of the track link. The track link assembly further comprises a track shoe attached on a lower rail surface thereof by a clamping means engaging a clamping surface formed on the track link. The clamping means may comprise at least one hook or U-bolt having an upper clamping end thereof engaged over the clamping surface of the track link.

BRIEF DESCRIPTION OF THE DRAWINGS

Further objects of this invention will become apparent from the following description and accompanying drawing wherein:

FIG. 1 is a partially sectioned side elevational view of a portion of an endless track assembly comprising a plurality of interconnected track link assemblies of this invention;

FIGS. 2 and 3 are sectional views taken in the direction of arrows II—II and III—III in FIG. 1, respectively; and FIG 4 is a sectional view, similar to FIG. 3, illustrating a modification of the track link assembly.

DETAILED DESCRIPTION

Referring to FIGS. 1–3, a plurality of interconnected track link assemblies 10 are adapted to form an endless track assembly of a track-type vehicle, such as a crawler tractor. Each pair of adjacent track link assemblies are connected together by a pin 11 and annular bushing 12 in a conventional manner to form the endless track assembly. In operation, bushings 12 further function as drive lugs upon their engagement with the teeth of a conventional drive sprocket (not shown) of the tractor.

Each track link assembly comprises a track link 13 which is symmetrical in configuration about a longitudinal axis thereof to adapt it for reversal purposes, hereinafter described. The track link defines substantially flat upper and lower parallel rail surfaces 14 and 15, respectively, and has a pin and bushing assembly mounted on each longitudinal end thereof. A pair of longitudinally spaced apertures 16 are formed transversely through the link to each define a pair of upper and lower notched-out clamping surfaces 17 and 18 on the link.

Upper rail surface 14 is adapted to engage track rollers mounted on the suspension system of the tractor (not shown) whereas a standard track shoe 19 is disposed on lower surface 15 of the track link. In this embodiment of the invention, the track shoe is attached to the link by a pair of longitudinally spaced clamping means in the form of hook bolts 20. Referring to FIG. 3, each of the bolts comprises a shank 21 which entends upwardly through a suitable bore formed through the track shoe and is attached thereto by a nut 22 threadably mounted on a lower end thereof to abut a bottom surface of the track shoe.

The shank is disposed on a side of the track link and has an upper clamping end 23 formed integrally therewith. The clamping end engages clamping surface 18 and extends transversely through aperture 16. The clamping end terminates at a bent portion 24 disposed in hooked relationship over clamping surface 18 to engage a side of the track link.

Upon undue wearing of one side of bushing 12 by its continuous engagement with the teeth of the tractor's drive sprocket (not shown), as indicated by phantom line 25, the endless track assembly is initially disconnected at its conventional master track link (not shown). Bolts 20 are then removed to release a respective track shoe 19 from each of the track link assemblies. The track shoe is then reattached on rail surface 14 to provide a new and unused sprocket engaging bearing surface on bushing 12 and rail surface 15. The endless track assemblies are then each suitably reinstalled on the tractor by reconnecting the master track links thereof, subsequent to a flopping-over of each track assembly.

FIG. 4 discloses a second track link assembly embodiment 10a wherein identical numerals depict corresponding constructions, but with numerals depicting modified constructions being accompanied by an "a." This embodiment essentially differs from the FIGS. 1–3 embodiment in that each of the clamping means comprises an inverted square bend U-bolt 20a. Each bolt comprises a pair of parallel shanks 21a each extending downwardly through a bore formed through a track shoe 19a and attached thereto by a nut 22.

The shanks extend downwardly from an upper clamping end 23a of the bolt which, in turn, extends transversely through aperture 16. The clamping end fully straddles clamping surface 18 of the track link to lock it in position on the track shoe. The above described procedure for reattaching the track shoe on rail surface 15 is substantially the same. In the event that rail surface 14 shows uneven wear, such surface can be suitably machined to a flat condition to match the inner flat surface of the track shoe.

I claim:

1. A track link assembly for an endless track assembly of a track type vehicle comprising a track link defining upper and lower rail surfaces hereon, means forming a clamping surface on said track link, a track shoe disposed on said lower rail surface, and clamping means engaging said clamping surface for releasably attaching said track shoe to said track link comprising a bolt having a shank thereof extending upwardly through said track shoe and disposed on a side of said track link and an upper clamping end engaging said clamping surface and a nut threadably mounted on a lower end of the shank of said bolt and disposed in abutting relationship with a bottom surface of said track shoe.

2. The track link assembly of claim 1 further comprising a pin and bushing assembly mounted in each longitudinal end of said track link.

3. The track link assembly of claim 1 wherein a pair of said clamping means releasably attach said track shoe to said track link.

4. The track link assembly of claim 1 wherein said link is substantially symmetrical about a longitudinal axis thereof and said upper and lower surfaces are each substantially flat and disposed in parallel relationship relative to each other.

5. The track link assembly of claim 1 wherein said clamping surface is defined by an aperture formed transversely through said track link.

6. The track link assembly of claim 5 wherein said clamping means comprises a hook bolt having the upper clamping end thereof extending transversely through said aperture in hooked relationship over said clamping surface.

7. The track link assembly of claim 5 wherein said clamping means comprises an inverted U-bolt having the upper clamping end thereof extending transversely through said aperture in straddled relationship over said clamping surface, said U-bolt further comprising a pair of said shanks extending downwardly from said clamping end and disposed on either side of said track link.

8. The track link assembly of claim 2 wherein a pair of said track links are each attached to said track shoe by a pair of said clamping means and a said pin and bushing assembly connects the longitudinal ends of said track links together.

* * * * *